United States Patent
Kawabata

[11] Patent Number: 5,911,810
[45] Date of Patent: Jun. 15, 1999

[54] COFFEE BREWING APPARATUS AND METHOD OF BREWING COFFEE BY THE APPARATUS

[75] Inventor: Akio Kawabata, Isesaki, Japan

[73] Assignee: Sanden Corp., Isesaki, Japan

[21] Appl. No.: 09/094,113

[22] Filed: Jun. 9, 1998

[30] Foreign Application Priority Data

Jun. 23, 1997 [JP] Japan .................................. 9-166366
Jun. 23, 1997 [JP] Japan .................................. 9-166370

[51] Int. Cl.$^6$ ....................................................... A47J 31/36
[52] U.S. Cl. ..................... 99/302 P; 99/289 P; 99/289 T
[58] Field of Search ............................ 99/302 P, 302 R, 99/289 P, 289 T

[56] References Cited

U.S. PATENT DOCUMENTS

| | | | |
|---|---|---|---|
| 4,421,014 | 12/1983 | Vicker .................................. | 99/289 P |
| 4,612,850 | 9/1986 | Kanazashi et al. .................... | 99/302 R |
| 5,103,716 | 4/1992 | Mikkelsen .............................. | 99/302 P |

Primary Examiner—Reginald L. Alexander
Attorney, Agent, or Firm—Kenjiro Hidaka

[57] ABSTRACT

A coffee brewing apparatus has a first cylinder, having a top opening and a bottom opening. A vertically movable second cylinder containing ground coffee, having a top opening and a bottom opening, is disposed below the first cylinder coaxially therewith. A vertically movable upwardly urged plunger, having a top head and a bottom head, is disposed through the bottom opening of the first cylinder, coaxially therewith, in a manner that the top head is sealingly and slidingly fitted in the first cylinder and the bottom head is adapted to be sealingly and slidingly fitted in the second cylinder through the top opening thereof. The plunger has a hot water exit channel vertically therethrough and a pressure-operated hot water release valve disposed in the channel. When water is provided in the first cylinder on the top head of the plunger and pressurized, the plunger is pressed down so that the ground coffee in the second cylinder is compacted by the plunger before the valve opens and pressurized hot water in the first cylinder is released through the hot water release channel to be poured onto the ground coffee.

10 Claims, 8 Drawing Sheets

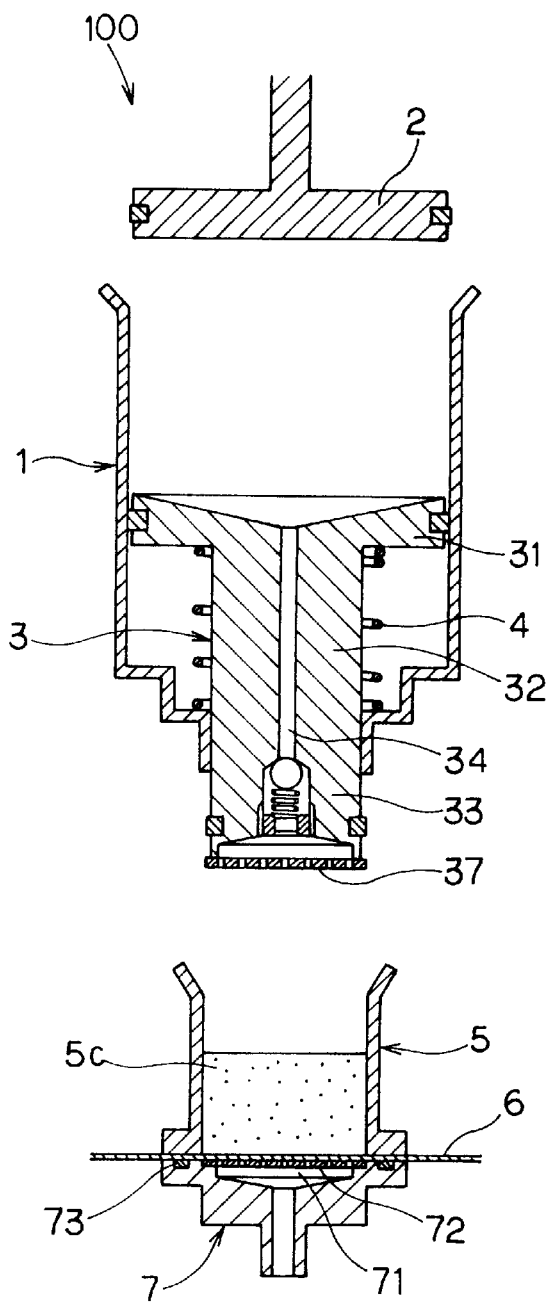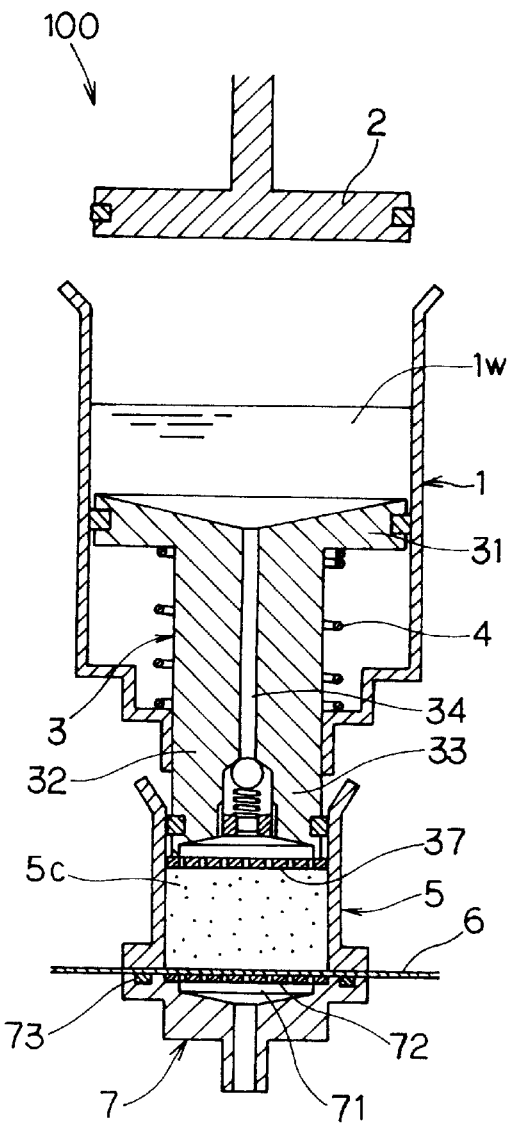

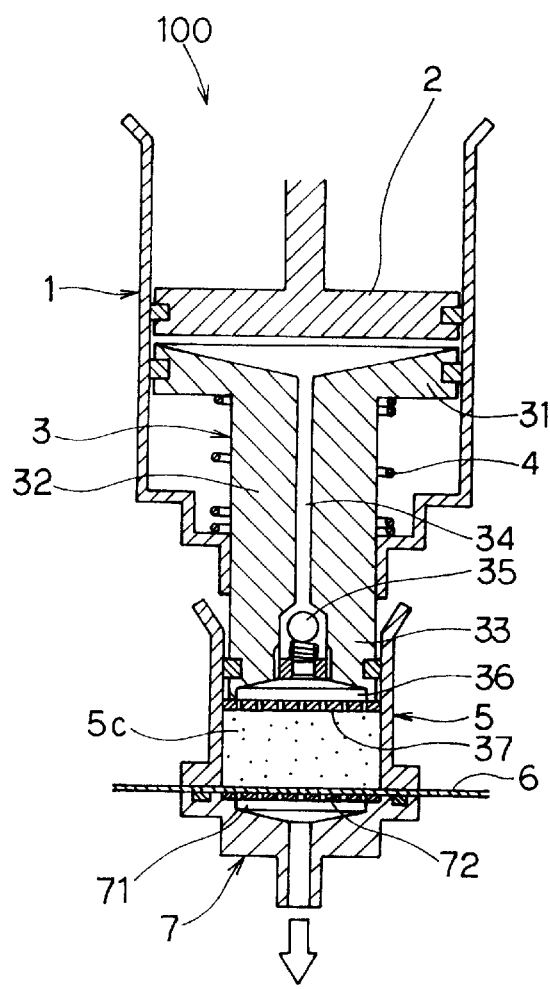
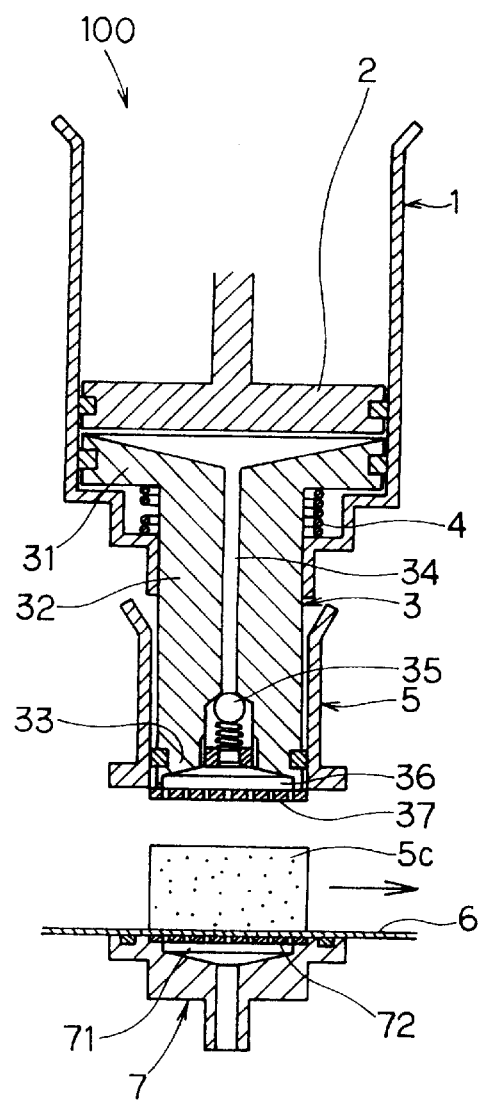

COFFEE BREWING APPARATUS AND METHOD OF BREWING COFFEE BY THE APPARATUS

BACKGROUND OF THE INVENTION

1. Field of the Invention

The present invention relates to a coffee brewing apparatus, which is particularly used in an automatic coffee dispenser, and a method of brewing coffee by the apparatus.

2. Description of the Prior Art

One of popular coffee brewing methods is to pour hot water onto ground coffee so that the hot water extracts coffee ingredient while passing through the ground coffee. In a simple method, the hot water passes down through the ground coffee by its own gravity. There is also a conventional method in which the hot water is forced to pass through ground coffee.

FIG. 11 shows a conventional coffee brewing system used in an automatic coffee dispenser. The system includes a water supply line 310, a water shutoff valve 311, a water heater 312, a hot water supply line 313, a hot water shutoff valve 314, and a coffee brewing apparatus 300, which is shown in elavational section.

The coffee brewing apparatus 300 includes a hot water supply cylinder 301, a piston 302, a cylindrical ground coffee holder 303, a strainer 304 and a coffee outlet funnel 305. The top open end of the ground coffee holder 303 is removably and sealingly fitted to the bottom open end of the hot water supply cylinder 301. The strainer 304 is tightly interposed between the ground coffee holder 303 and the coffee outlet funnel 305. The piston 302 is adapted to sealingly and slidingly fit the hot water supply cylinder 301 internally.

A predetermined quantity of ground coffee 303c is deposited in the holder 303 before it is fitted to the hot water supply cylinder 301. The water provided through the water supply line 310 to the water heater 312 is heated up to a near boiling temperature at a regulated pressure. A predetermined quantity of hot water 301w is provided from the water heater 312 into the hot water supply cylinder 301 through the hot water supply line 313 by opening the hot water shutoff valve 314 for a predetermined time period. Then, the piston 302 is lowered into the cylinder 301 so that the hot water 301w in the cylinder 301 and most of the air trapped in the cylinder 301 are forced down through the ground coffee 303c in the holder 303. Then, the hot water extracts coffee ingredient from the ground coffee 303c while passing therethrough and comes out through the strainer 304 and the coffee outlet funnel 305, as shown by an arrow in FIG. 11.

Another popular conventional coffee brewing method is to deposit ground coffee into hot water and blow air into the mixture of the hot water and the ground coffee so that the ground coffee is agitated in the hot water. This method, however, is not adequate for producing strong coffee because it requires a comparatively large quantity of hot water per unit quantity of ground coffee.

Whereas some disadvantages are known pertaining to the method by the apparatus 300 shown in FIG. 11. Since the ground coffee 303c is loosely deposited in the ground coffee holder 303, granules of the ground coffee 303c tend to shift from one place to another in the holder as the hot water flows down in the holder. This results in a creation of a partial hot water flow path in the holder, which is known as "channeling". The channeling effect causes the ground coffee in the holder to be subjected to the hot water unevenly. Since the channeling occurs randomly in the holder, coffee liquid of varied density tends to be produced in each coffee making process. In the above described coffee brewing method by the apparatus 300, the hot water starts to flow down through the ground coffee as soon as the cylinder 301 starts receiving hot water before the piston 302 enters the cylinder 301 to force the hot water down. This early flow of hot water also causes undesirable "channeling" in the ground coffee.

SUMMARY OF THE INVENTION

In view of the above situation, it is a primary object of the present invention to provide a coffee brewing apparatus suitable for automatic coffee dispenser, in which no "channeling" occurs in the ground coffee.

In order to achieve the object, the coffee brewing apparatus according to the present invention and the method of brewing coffee by the apparatus have the following features.

The coffee brewing apparatus has a first cylinder, having a top opening and a bottom opening, for containing a predetermined quantity of hot water, a vertically movable piston, a vertically movable second cylinder disposed below the first cylinder coaxially therewith, having a top opening and a bottom opening, for holding ground coffee therein, a vertically movable plunger having a top head and a bottom head, and a vertically movable filter support block disposed below the second cylinder.

The plunger is disposed coaxially with the first and the second cylinders through the bottom opening of the first cylinder in a manner that its top head is fitted in the first cylinder sealingly and slidingly and its bottom head is adapted to be fitted in the second cylinder sealingly and slidingly through its top opening. The plunger further has a hot water exit channel vertically therethrough. The top head of the plunger has a diameter greater than that of the bottom head. A pressure-operated hot water release valve is disposed in the hot water exit channel which opens when hot water in the first cylinder is pressurized to a predetermined pressure. The plunger is upheld by a compression coil spring, which is disposed in the first cylinder coaxially therewith, in the top head, so that the plunger is upwardly urged by the spring when the top head is subjected to a downward pressure.

A paper filter is horizontally disposed on the filter support block in a manner that the filter can be held sandwiched between the filter support block and the second cylinder so that the filter covers the bottom opening of the second cylinder when the filter support block is at an elevated level. The filter support block has a flat strainer fitted on top thereof and a coffee outlet funnel under the strainer. The strainer keeps the filter from sagging when the filter is sandwiched between the filter support block and the second cylinder.

A predetermined quantity of ground coffee is deposited in the second cylinder when the filter is tightly sandwiched between the filter support block and the second cylinder. Next, the filter support block, the filter and the second cylinder are together elevated so that the bottom head of the plunger comes into the second cylinder and reaches the top of the ground coffee therein. Then, a predetermined quantity (for one cup) of hot water is introduced into the first cylinder on the top head of the plunger. Succeedingly, the piston is lowered into the first cylinder so that the descending piston causes the trapped air and the hot water inside the first cylinder to be pressurized. At this time, the plunger will be pressed down by the pressure while the coil spring is compressed. The descending plunger compacts the ground coffee in the second cylinder. As the piston keeps descending, an increased pressure of the hot water causes the pressure-operated hot water release vale to open, and the hot water is released onto the compacted ground coffee through the hot water exit channel in the plunger. Coffee brewing takes place in the second cylinder as the hot water passes down through the ground coffee and coffee liquid comes out of the coffee outlet funnel in the filter support block.

Since the ground coffee is preliminarily compacted by the plunger and completely confined in the second cylinder between the bottom head of the plunger on the top and the filter on the bottom, granules of the ground coffee can never shift to create a partial hot water flow path therein. Furthermore, since the hot water release valve keeps the hot water from being discharged until its pressure reaches a predetermined level, the ground coffee will not be subjected to the hot water before it is compacted and completely packed in the second cylinder. Thus, there will be no undesirable channeling effect in the coffee brewing method according to the present invention.

BRIEF DESCRIPTION OF THE DRAWINGS

FIGS. 3 to 8 are elevational sectional views of the components shown in FIG. 2, shown in various stages in the operation of the coffee brewing apparatus;

DETAILED DESCRIPTION OF THE PREFERRED EMBODIMENTS

The present invention will now be described in detail in reference to FIGS. 1 to 8.

Figure 1:
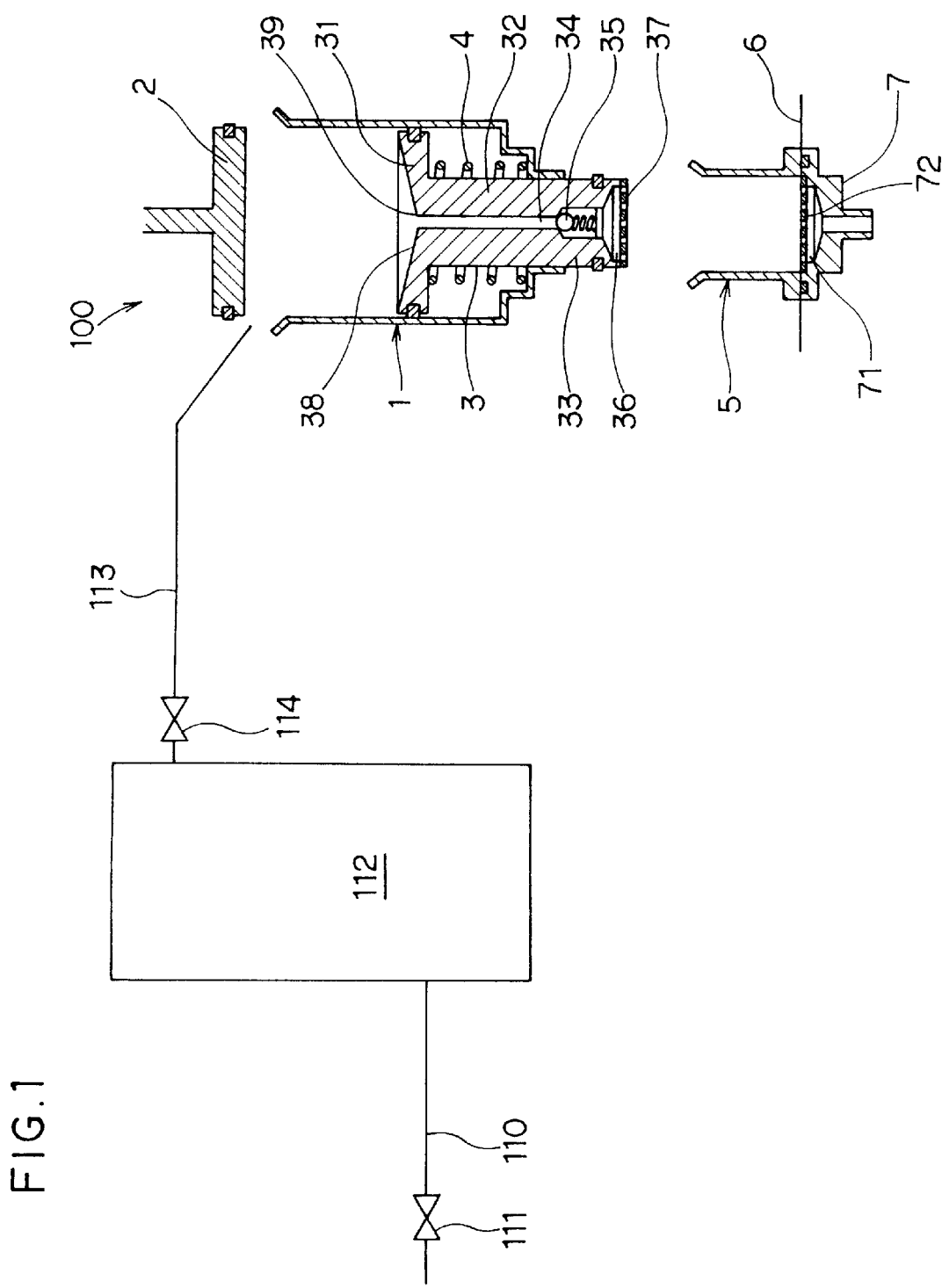
FIG. 1 shows a system including main components of a coffee brewing apparatus according to the present invention, in which the apparatus is shown in elevational section.
Figure 2:
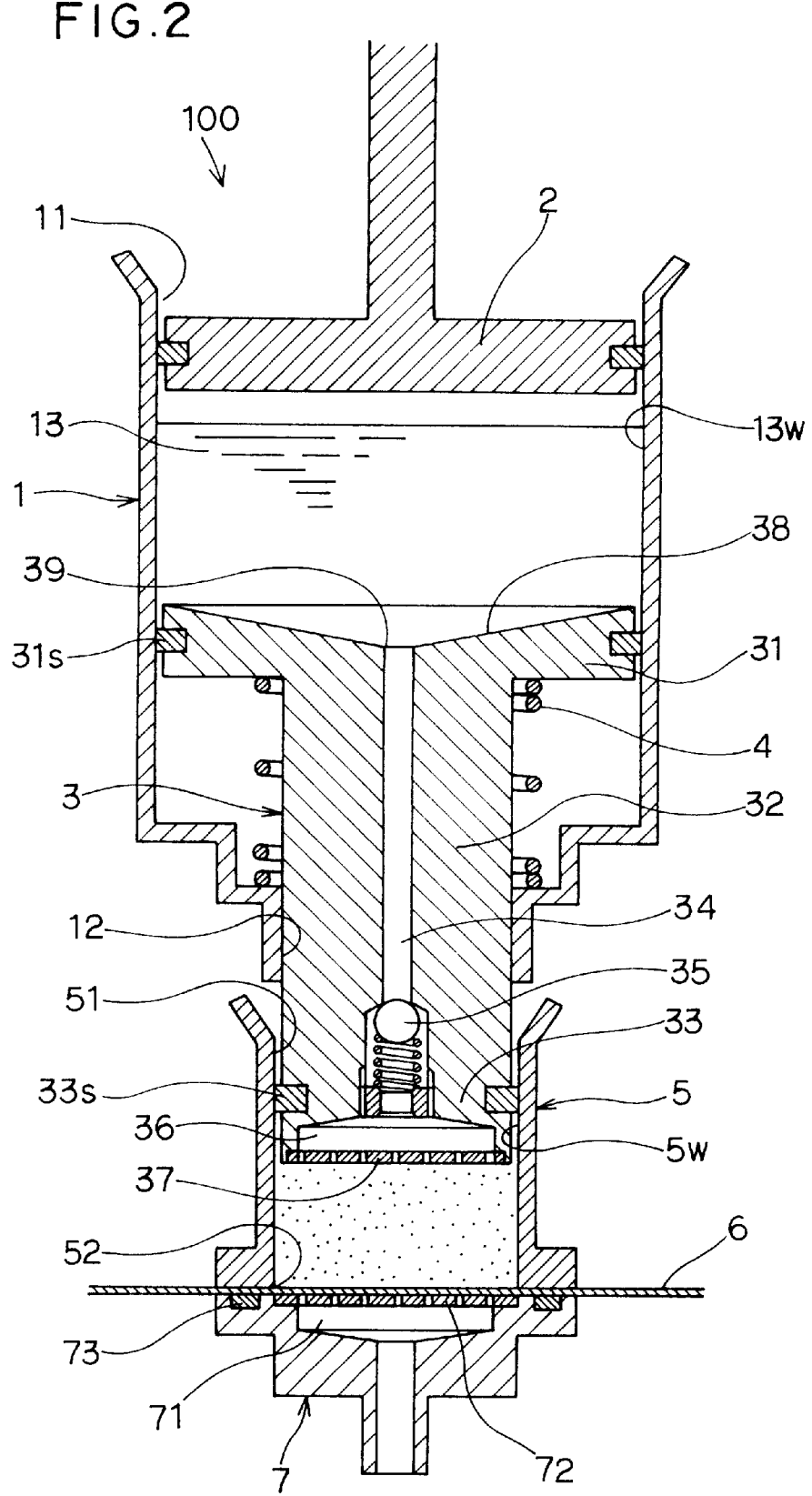
FIG. 2 is an enlarged elvational sectional view of the main components of the coffee brewing apparatus shown in FIG. 1.

In FIG. 1, a coffee brewing system used for an automatic coffee dispenser has a water supply line 110, a water shutoff valve 111, a water heater 112, a hot water supply line 113, a hot water shutoff valve 114, and a coffee brewing apparatus 100 according to the present invention. For clarification purposes, only main components of the coffee brewing apparatus 100 are shown, in elevational section, in all of FIGS. 1 to 8. FIG. 2 is an enlarged view of the coffee brewing apparatus 100, in which some components thereof are positioned at different levels from those shown in FIG. 1.

Referring to FIGS. 1 and 2, the coffee brewing apparatus 100 includes a hot water supply cylinder 1, a piston 2, a ground coffee compacting plunger 3, a plunger upholding compression coil spring 4, a coffee brewing cylinder 5 disposed under the hot water supply cylinder 1, a paper filter 6, and a round filter support block 7 disposed under the coffee brewing cylinder 5.

The cylinder 1 has a top opening 11, a bottom opening 12, and a hot water containing chamber 13. The plunger 3 integrally has a top head 31, a body 32, and a bottom head 33. The plunger 3 further has a vertical hot water exit channel 34 in the diametrical center thereof, a pressure-operated, spring-loaded hot water release valve 35 disposed in the channel 34, a shallow, inverted funnel-like hot water spreading chamber 36 in a bottom end part of the bottom head 33, and a flat strainer 37 having a number of perforations. The strainer 37 is fitted onto the bottom head 33 immediately under the hot water spreading chamber 36. The top head 31 has a sealing ring 31s fitted to its side periphery and a funnel-like sink 38 on the top thereof. In the diametrical center of the sink 38, i.e. the bottom thereof, is provided an inlet 39 to the hot water exit channel 34. The bottom head 33 has a sealing ring 33s fitted to its side periphery. The body 32 and the bottom head 33 have an even diameter, which is much smaller than that of the top head 31. The diameter of the top head 31 is substantially equal to that of the top opening 11 and the chamber 13 of the cylinder 1. The diameter of the body 32 and the bottom head 33 of the plunger 3 is substantially equal to that of the bottom opening 12 of the cylinder 1. When the valve 35 is open, the chamber 13 of the cylinder 1 and the hot water spreading chamber 36 are communicated with each other through the inlet 39 and the hot water exit channel 34.

The coffee brewing cylinder 5 has a top opening 51 and a bottom opening 52. The cylinder 5 has a uniform inside diameter that is substantially equal to that of the body 32 and the bottom head 33 of the plunger 3.

The filter support block 7 has a coffee outlet funnel 71 integrally, a flat strainer 72, and a sealing ring 73. The strainer 72, having a number of perforations, is fitted to the top of the filter support block 7 covering the funnel 71 thereon in a manner that the top of the strainer 72 and the top of the filter support block 7 are flush with each other. The function of the sealing ring 73 will be explained later.

The top head 31 of the plunger 3 is always disposed in the chamber 13 of the cylinder 1 and the body 3 thereof is disposed through the bottom opening 12 of the cylinder 1. The top head 31 is slidingly and sealingly in contact with an inside wall 13w of the chamber 13 and the body 3 slidingly fits the bottom opening 12 of the cylinder 1. The compression coil spring 4 is placed inside the hot water supply cylinder 1 in a manner that the body 32 of the plunger 3 is disposed through the spring 4 and the spring 4 upholds the plunger 3 in the top head 31. The spring 4 will exert a counter upward urging force to the plunger 3 when the plunger 3 is pressed downwardly.

The hot water supply cylinder 1, the piston 2, the plunger 3, the coil spring 4, and the coffee brewing cylinder 5 are all disposed coaxially with one another. The cylinder 1 is stationary, but the piston 2, the cylinder 5 and the filter support block 7 can be moved vertically by respective actuators (not shown).

When the piston 2 is lowered, it fits the hot water supply cylinder 1 internally, maintaining sliding and sealing contact with the wall 13w of the chamber 13 thereof, as shown in FIG. 2. When the coffee brewing cylinder 5 is elevated, it externally fits the bottom head 33 of the plunger 3 and the bottom head 33 maintains sliding and sealing contact with an inside wall 5w of the cylinder 5, as shown in FIG. 2.

Still referring to FIGS. 1 and 2, the round filter support block 7 is provided under the coffee brewing cylinder 5 in a manner that a top part of the filter support block 7 coaxially opposes a bottom part of the coffee brewing cylinder 5. The outside diameter of the top part of the filter support block 7 matches the outside diameter of the bottom part of the coffee brewing cylinder 5.

The paper filter 6 is provided on the filter support block 7. This filter 6 will be tightly sandwiched between the filter support block 7 and the coffee brewing cylinder 5, as shown in FIGS. 1 and 2, when coffee brewing takes place, as will be explained in detail later.

Although not shown, a control device is provided to operate the hot water shutoff valve 314 and the actuators (not shown) for operating the piston 2, the cylinder 5 and the filter support block 7.

Now, the function of the coffee brewing apparatus 100 and the method of brewing coffee using the apparatus 100 will be explained.

The piston 2 initially rests upwardly apart from the hot water supply cylinder 1, as shown in FIG. 1. The plunger 3 is, at this time, upheld by the spring 4 at its highest level without any pressure being applied thereonto. The pressure-operated hot water release valve 35 is normally closed.

Initially, the cylinder 5 is at a lowered position and vertically separated from the plunger 3, as shown in FIG. 1.

A new paper filter 6 is placed on the filter support block 7 while the filter support block 7 is initially vertically separated from the cylinder 5. Then, the filter support block 7 is raised until the filter 6 is tightly sandwiched between the cylinder 5 and the block 7, as shown in FIG. 3. The paper filter 6 is now tightly sandwiched between the top end of the filter support block 7 and the bottom end of the coffee brewing cylinder 5. The top of the sealing ring 73, fitted onto the filter support block 7, is slightly above the top face of the filter support block 7 when the paper filter 6 is not in contact with the cylinder 5. When the filter 6 is tightly sandwiched between the filter support block 7 and the cylinder 5, the sealing ring 73 causes the filter 6 to be tightly pressed against the round bottom face of the cylinder 5 so that no coffee liquid will escape sideways between the filter support block 7 and the cylinder 5. At this stage, a predetermined quantity of ground coffee 5c is supplied into the coffee brewing cylinder 5, as shown in FIG. 3.

Next, the cylinder 5 and the filter support block 7, together with the filter 6 therebetween, are raised until the bottom head 33 of the plunger 3 comes into the cylinder 5 and, further, the strainer 37, which is installed on the bottom head 33, touches the top of the ground coffee 5c in the cylinder 5, as shown in FIG. 4.

Referring now to FIG. 1, the water heater 112 contains hot water having, in this embodiment, a temperature of about 95° C. at a regulated pressure.

Referring to FIGS. 1 and 4, the hot water shutoff valve 114 is opened to provide a predetermined quantity (one cupful) of hot water 1w into the hot water supply cylinder 1 through the hot water supply line 113.

Figure 5:
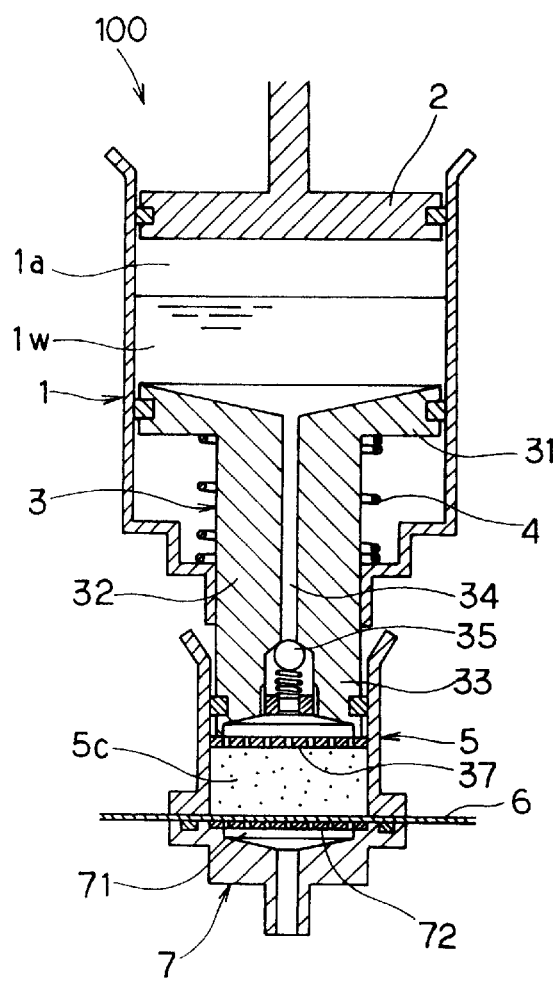

Then, referring to FIG. 5, the piston 2 is lowered into the cylinder 1 so that air 1a trapped in the cylinder 1 and the hot water 1w therein are pressurized by the piston 2. The pressure of the air 1a and the hot water 1w in the cylinder 1 increases as the piston 2 descends as long as the valve 35 in the hot water exit channel 34 is closed. The increased pressure of the hot water 1w is applied onto the top head 31 of the plunger 3, so that the plunger 3 is pressed down against the upward urging force of the coil spring 4. Then, the bottom head 33, with the strainer 37, of the plunger 3 presses down the ground coffee 5c in the cylinder 5, thereby causing the ground coffee 5c to be compacted by the plunger 3. It should be understood that the diameter of the top head 31 is purposely designed greater than that of the bottom head 33 so that the pressure per unit area applied onto the ground coffee 5c by the bottom head 33 is greater than the pressure per unit area applied by the hot water 1w onto the top head 31.

Figure 6:
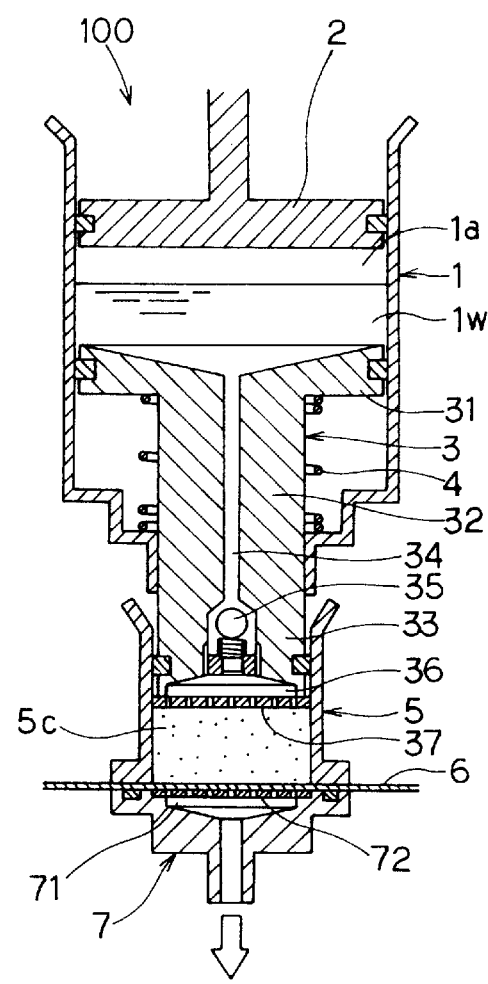

Referring now to FIG. 6, when the pressure of the hot water 1w reaches a predetermined level, the pressure-operated release valve 35 opens, and the pressurized hot water 1w spurts out from the hot water exit channel 34 to the hot water spreading chamber 36. The chamber 35 is diametrically substantially widened with respect to the diametrical dimension of the hot water exit channel 34. As the pressurized hot water 1w spurts out to the diametrically widened hot water spreading chamber 36 from the narrow channel 34, the hot water radially evenly spreads in the chamber 36 due to a nozzle effect so that the hot water is poured down radially evenly onto the compacted ground coffee 5c through the strainer 37.

As the hot water passes down through the compacted ground coffee 5c, it extracts coffee essence therefrom and turns into coffee liquid. The coffee liquid passes down through the paper filter 6, the strainer 72, and comes out from the coffee outlet funnel 71 of the filter support block 7, as shown by the wide arrow in FIG. 6.

Referring to FIG. 7, as the piston 2 further comes down, most of the air 1a (FIGS. 5 and 6) trapped in the hot water supply cylinder 1 will also be forced out of the cylinder 1 by the piston 2. This air will free most of the residual coffee liquid in the cylinder 5 as it passes down through the ground coffee 5c. At this time, the piston 2 has come down to reach the top head 31 of the plunger 3, as shown in FIG. 7.

Referring now to FIG. 8, the valve 35 is now closed since the piston 2 has touched the plunger 3. The piston 2 will further be moved down, so that the plunger 3 is pushed down by the piston 2. On the other hand, the filter support block 7, together with the paper filter 6 thereon, is lowered and separated from the cylinder 5, while the plunger 3 is pushed down by the piston 2. Then, the coffee-grounds (waste ground coffee 5c) in the cylinder 5 will be pushed down out of the cylinder 5 by the descending plunger 3 onto the paper filter 6 that is on the filter support block 7, as shown in FIG. 8.

In the present embodiment, the paper filter 6 is supplied continuously from a rolled paper filter. The used part of the paper filter 6, together with the coffee-grounds thereon, is moved sideways, as shown by an arrow in FIG. 8, to be discarded, and is replaced with a new part of paper filter by a filter replacer (not shown).

Succeedingly, the piston 2 is elevated to the initial level, so that the plunger 3, being urged by the coil spring 4, moves up to its rest position, and the coffee brewing cylinder 5 is moved down to reach the new paper filter 6 that is now placed on the filter support block 7. At this time, the apparatus 100 has reverted its initial state and its components are all in the initial positions, as shown in FIG. 1.

Figure 9:
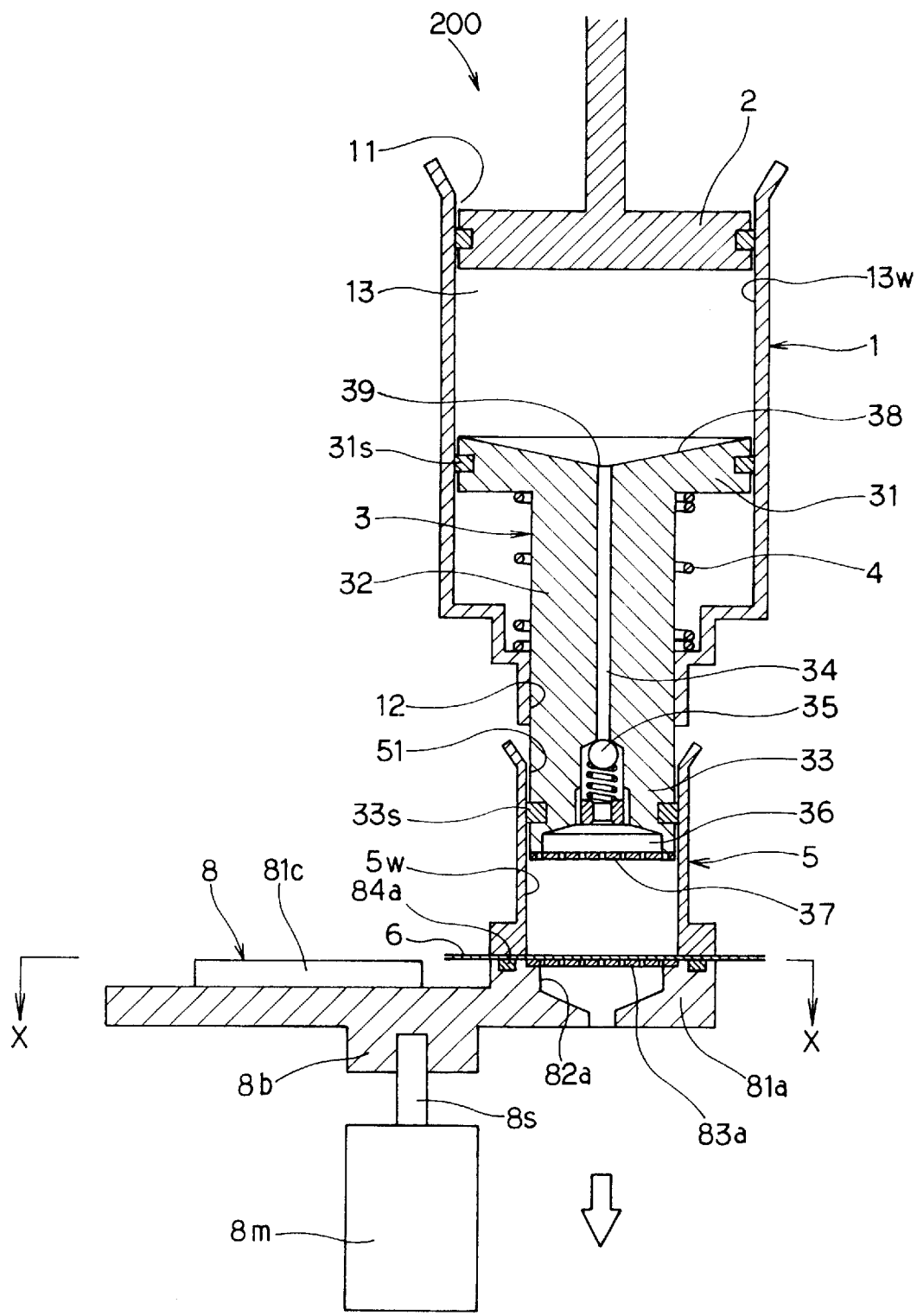
FIG. 9 is an elvational sectional view of main components of a coffee brewing apparatus according to the second embodiment of the present invention.

FIG. 9 shows, in elevational section, main components of a coffee brewing apparatus 200 according to the second embodiment of the present invention. In the apparatus 200, all of its components, except its filter support block unit 8, are identical to those of the coffee brewing apparatus 100 of the first embodiment described above. Like reference numbers of the apparatus 200 in FIGS. 9 denote like components of the apparatus 100 shown in FIGS. 1 to 8. The explanation on the construction and function of the apparatus 200 will, therefore, be made on the filter support block unit 8 only.

Figure 10:
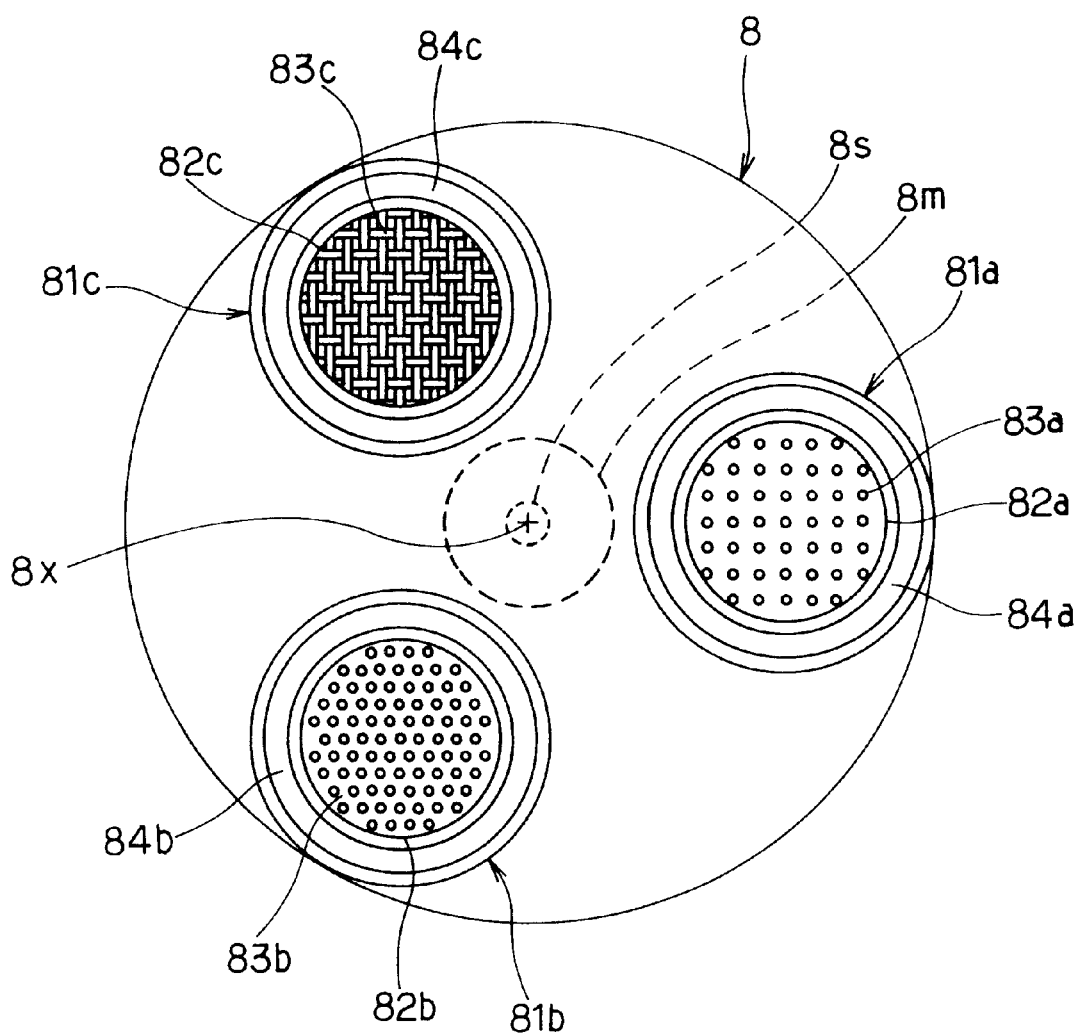
FIG. 10 is a plan view taken on line X—X of FIG. 9.
Figure 11:
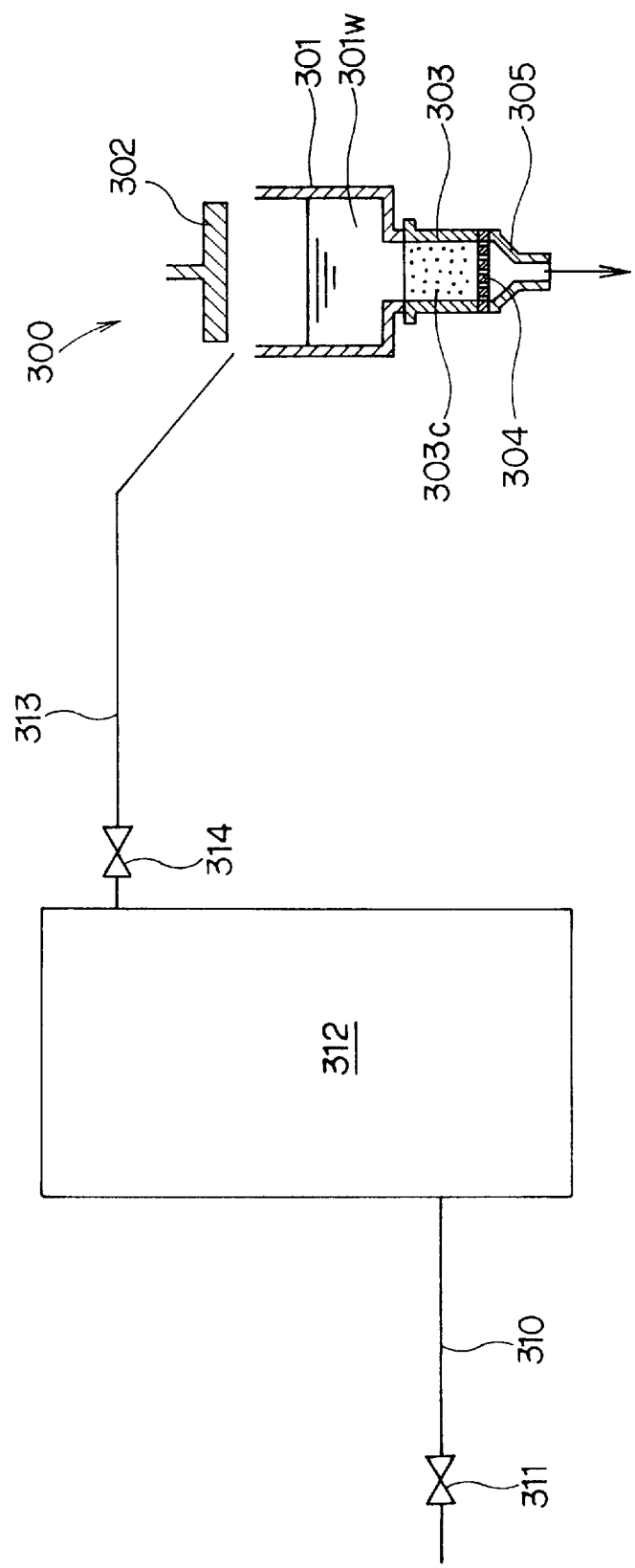
FIG. 11 shows a system including main components of a conventional coffee brewing apparatus, which is shown in elevational section.

FIG. 10 is a plan view taken on line X—X of FIG. 9. Referring to FIGS. 9 and 10, the filter support block unit 8 of the apparatus 200 has a horizontally rotatable generally disc-like filter support block 8b, a vertical drive shaft 8s fixedly attached to the block 8b in its diametrical and rotational center 8x, and a servo motor 8m that rotates the drive shaft 8s. The block 8b integrally has three round filter support block sections 81a, 81b and 81c that are disposed angularly spaced from one another at 120° interval at a radially equidistance from the rotational center 8x. The block sections 81a, 81b and 81c integrally have coffee outlet funnels 82a, 82b and 82c, respectively. Flat round strainers 83a, 83b and 83c are fitted on the block sections 81a, 81b and 81c, respectively, coaxially with the coffee outlet funnels 82a, 82b and 82c, respectively. Tops of the strainers 83a, 83b and 83c and tops of the block sections 81a, 81b and 81c are flush with one another and all at an even level. The strainers 83a and 83b are perforation-type strainers having different numbers of perforations from each other and the strainer 83c is a mesh-type strainer. Sealing rings 84a, 84b and 84c are also fitted onto the block sections 81a, 81b and 81c, respectively, around the strainers 83a, 83b and 83c, respectively.

The entire filter support block unit 8 can be vertically moved as in the case of filter support block 7 of the coffee brewing apparatus 100 described above. The servo motor 8m has an encoder (not shown) and is controlled by a motor controller (not shown) in reference to a signal transmitted from an angular-positional sensor (not shown) installed on the body 8b so that a selected one out of the three filter support block sections 81a, 81b and 81c can be positioned opposing and under the coffee brewing cylinder 5 coaxially therewith.

In the operation of the coffee brewing apparatus 200, one of the three filter support block sections 81a, 81b or 81c, having a proper strainer, is selected. While the filter support block unit 8 is at a lowered level with respect to the level of the coffee brewing cylinder 5, the body 8b of the filter support block unit 8 is turned by the motor 8m so that the selected block section opposes the cylinder 5. Then, a new paper filter 6 is placed on the selected block section and the filter support block unit 8 is raised so that the filter 6 is tightly sandwiched between the cylinder 5 and the selected block section. The function of each of the filter support block sections 81a, 81b and 81c is exactly the same as that of the filter support block 7 of the coffee brewing apparatus 100 described above.

The coffee brewing method by the apparatus 200 is also identical to that by the apparatus 100 except that one of the filter support block sections 81a, 81b or 81c, having a proper strainer, can be selected when the apparatus 200 is used. The selection of the strainer 83a, 83b or 83c affects the quantity of the coffee liquid that passes through the strainer per unit time. The less the quantity, the stronger the coffee will be. Foamy coffee can be produced by selecting a perforation-type strainer.

It should also be understood that various changes and modifications may be made in the above described embodiments which provide the characteristics of the present invention without departing from the spirit and principle thereof particularly as defined in the following claims.

What is claimed is:

1. A coffee brewing apparatus, comprising:
   (a) a cylindrical hot water container, said container having a bottom opening;
   (b) means for pressurizing said container internally;
   (c) a vertically movable cylindrical ground coffee holder, disposed below said container coaxially therewith, having a top opening and a bottom opening;
   (d) a vertically movable plunger having a top head and a bottom head, said plunger being disposed coaxially with said container and said holder through said bottom opening of said container in a manner that said top head is fitted in said container sealingly and slidingly and said bottom head is adapted to be fitted in said holder sealingly and slidingly through said top opening thereof, said plunger having a hot water exit channel vertically therethrough;
   (e) a hot water release valve disposed in said hot water exit channel; and
   (f) means for upwardly urging said plunger.

2. A coffee brewing apparatus according to claim 1, wherein said hot water container has a top opening and said means for pressurizing said hot water container internally is a vertically movable piston, disposed coaxially with said container, that is adapted to sealingly and slidingly fit said container internally through said top opening thereof.

3. A coffee brewing apparatus according to claim 1, wherein said means for upwardly urging said plunger is a compression coil spring disposed internally of said container coaxially therewith.

4. A coffee brewing apparatus according to claim 1, wherein said hot water release valve is a pressure-operated valve.

5. A coffee brewing apparatus according to claim 1, wherein a diameter of said top head of said plunger is greater than a diameter of said bottom head thereof.

6. A coffee brewing apparatus according to claim 1, wherein said top head of said plunger has a funnel-like sink on top thereof.

7. A coffee brewing apparatus according to claim 1, wherein said bottom head of said plunger has a hot water spreading chamber in a bottom part thereof, said chamber being diameterically widened with respect to a diametrical dimension of said hot water exit channel and communicated with said hot water exit channel when said hot water release valve is open.

8. A coffee brewing apparatus according to claim 1, the apparatus further comprising:
   (g) a vertically movable, horizontally rotatable filter support block having a plurality of filter support block sections, said filter support block sections being disposed angularly evenly spaced about an rotational center of said filter support block at an even level and a radially equidistance from said rotational center, each of said filter support block sections having a strainer and a coffee outlet under said strainer, each of said filter support block sections being adapted to support a filter thereon in a manner that said filter is sandwiched between said ground coffee holder and said filter support block section.

9. A coffee brewing apparatus, comprising:
   (a) a first cylinder for containing a quantity of hot water therein, said first cylinder having a top opening and a bottom opening;
   (b) a vertically movable piston for pressurizing hot water in said first cylinder, said piston being disposed coaxially with said first cylinder and being adapted to sealingly and slidingly fit said first cylinder internally through said top opening thereof;
   (c) a vertically movable second cylinder for holding ground coffee therein, said second cylinder being disposed below said first cylinder coaxially therewith, said second cylinder having a top opening and a bottom opening;
   (d) a vertically movable plunger having a top head and a bottom head, said plunger being disposed coaxially with said first and second cylinders through said bottom opening of said first cylinder in a manner that said top head is fitted in said first cylinder sealingly and slidingly and said bottom head is adapted to be fitted in said second cylinder sealingly and slidingly through said top opening thereof so as to compress ground coffee in said second cylinder when said second cylinder is at an elevated level and hot water in said container is pressurized, said plunger having a hot water exit channel vertically therethrough;

(e) a pressure-operated hot water release valve disposed in said hot water exit channel which opens when hot water in said first cylinder is pressurized to a predetermined pressure by said piston;

(f) means for upwardly urging said plunger;

(g) a vertically movable filter support member disposed below said second cylinder; and (h) a filter disposed on said filter support member in a manner that said filter is sandwiched between said filter support member and said second cylinder so that said filter covers said bottom opening of said second cylinder when said filter support member is at an elevated level.

10. A coffee brewing apparatus, comprising:

(a) a hot water container;

(b) a ground coffee holder having a bottom opening;

(c) means for introducing hot water in said container onto ground coffee in said holder; and (d) a vertically movable, horizontally rotatable filter support block having a plurality of filter support block sections, said filter support block sections being disposed angularly evenly spaced about an rotational center of said filter support block at an even level and a radially equidistance from said rotational center, each of said filter support block sections having a strainer and a coffee outlet under said strainer, each of said filter support block sections being adapted to support a filter thereon in a manner that said filter is sandwiched between said ground coffee holder and said filter support block section.

* * * * *